United States Patent

[11] 3,542,331

[72] Inventor Carlos R. Canalizo
 Dallas, Texas
[21] Appl. No. 730,102
[22] Filed May 17, 1968
[45] Patented Nov. 24, 1970
[73] Assignee Otis Engineering Corporation
 Dallas, Texas
 a corporation of Delaware

[54] VALVES
 12 Claims, 7 Drawing Figs.
[52] U.S. Cl. .................................................. 251/14,
  251/58, 251/113
[51] Int. Cl. ................................................. F16k 31/14,
  F16k 31/16
[50] Field of Search ........................................ 251/58, 25,
  113, 14

[56] References Cited
UNITED STATES PATENTS

| | | | |
|---|---|---|---|
| 654,009 | 7/1900 | Kittinger et al. | 251/113 |
| 3,207,468 | 9/1965 | Lauducci et al. | 251/58 |
| 3,298,659 | 1/1967 | Cupedo | 251/58X |
| 3,319,925 | 5/1967 | Kojima et al. | 251/58 |
| 3,367,365 | 2/1968 | Stevens | 251/58X |
| 3,450,382 | 6/1969 | Calim | 251/256X |

Primary Examiner—M. Cary Nelson
Assistant Examiner—Michael O. Sturm
Attorney—E. Hastings Ackley ABSTRACT: An actuator for a rotary-type valve having booster means for assuring actuation of the valve and which is failsafe and automatically operative to close the valve.

Patented Nov. 24, 1970

3,542,331

INVENTOR
Carlos R. Canalizo

BY Hastings Ackley
and
Walter J. Jay
ATTORNEYS

INVENTOR
Carlos R. Canalizo

BY *Hastings Ackley and Walter J. Jaymes*

ATTORNEYS

VALVES

This invention relates to valves and more particularly to actuators for rotary-type valves.

It is one object of the invention to provide an actuator mechanism or motor operator for a rotary-type valve which is adapted for remote control of actuation of the valve.

An important object of the invention is to provide a valve actuator having means for utilizing pressure of fluids flowing through the valve to assist in moving the valve from open to closed positions.

Still another object of the invention is to provide an actuator for a rotary-type valve which is fail safe and which will automatically close the valve in the event of failure of fluid pressure controlling actuation of the operator mechanism, whereby the actuator will automatically close the valve.

A further particular object of the invention is to provide an actuator having means for utilizing fluid pressure within the valve assembly for reducing the effect of friction acting on the valve as a result of increased pressures of the fluids controlled by the valve.

Still another object of the invention is to provide a fluid pressure operable actuator or motor mechanism for rotating a rotary-type valve which is operable from a remote point and which is normally held in open position, but which is operable to permit the valve to close in response to a predetermined condition or signal.

Additional objects and advantages of the invention will be readily apparent from the reading of the following description of valves constructed in accordance with the invention, and reference to the accompanying drawings thereof wherein.

Figures 1, 5, 6:
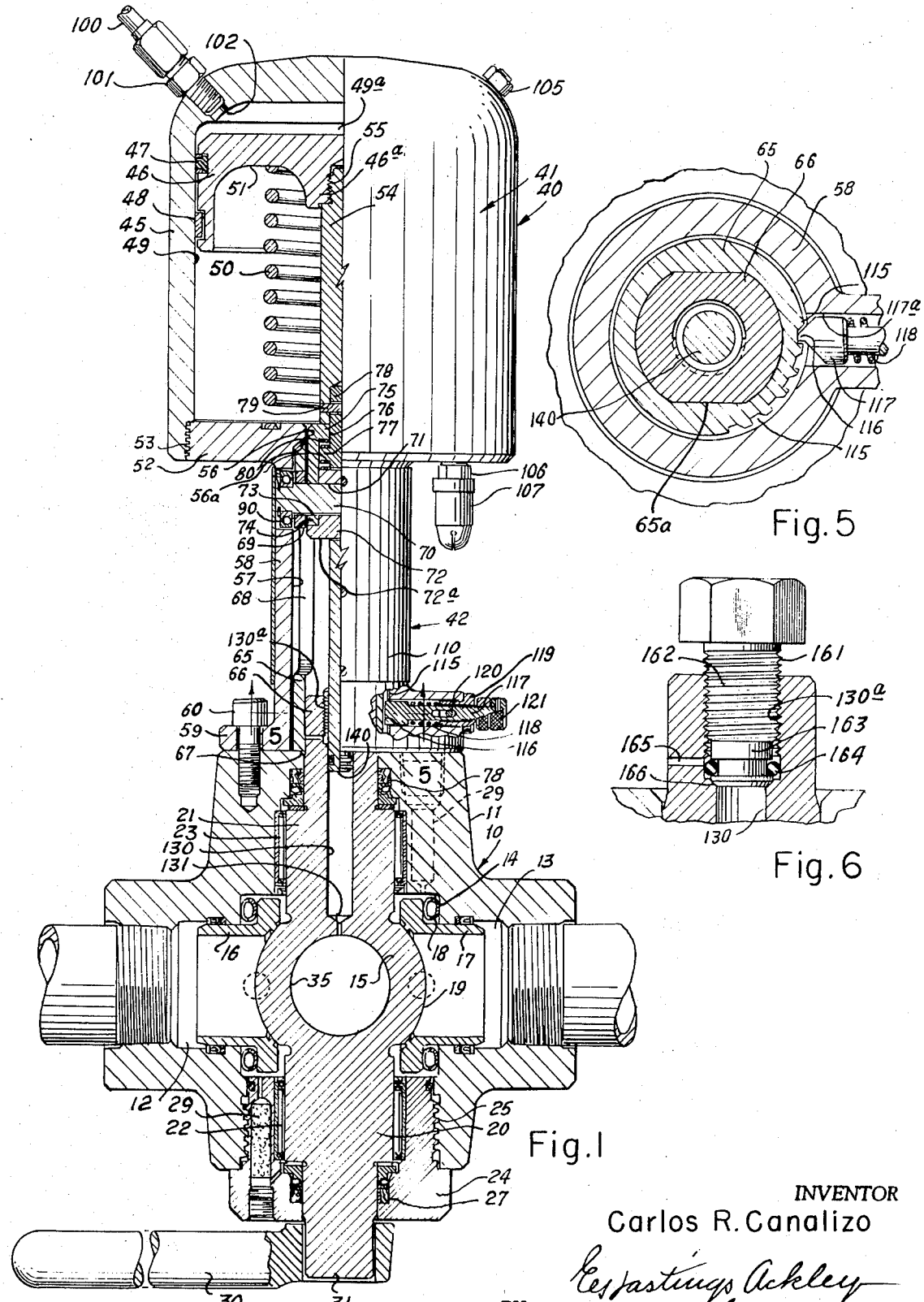
FIG. 1 is a view partly in elevation and partly in section of a rotary ball valve having a fluid pressure operated actuator mechanism for rotating the ball valve.
FIG. 5 is a fragmentary cross-sectional view taken on the line 5—5 of FIG. 1.
FIG. 6 is a fragmentary view of a plug for the bore of the booster piston cylinder of the valve trunnion; and, FIG. 7 is a vertical sectional view of a valve having a modified form of the actuator.

In the drawings, the numeral 10 designates generally a rotary ball type valve of the type illustrated and more completely described in the U.S. Pat. to Norman F. Brown No. 3,384,337. The valve includes a housing 11 having an inlet passage 12 and an outlet passage 13 communicating with a transverse bore 14 in which a ball type rotary plug closure member 15 is rotatably disposed. The ball closure engages seat members 16 and 17 which are resiliently biased by means of springs 18 into contact with the central spherical portion 19 of the ball. The trunnions 20 and 21 of the closure member are rotatably supported by antifriction bearings 22 and 23. The bearings 22 are supported in a gland member 24 which closes the lower enlarged portion 25 of the transverse bore of the valve body and permits the insertion of the ball valve member, seats and other parts into the body. Seal assemblies 27 and 28 are disposed in the housing surrounding the trunnions, and lubricating assemblies 29, of the type illustrated in the patent to Brown aforesaid, provided for low friction turning of the ball by means of the trunnions. An operating handle 30 may be fitted onto the rectangular or other suitably shaped projecting shank 31 on the projecting end of the trunnion extending outwardly through the end 24.

The ball valve member 15 has a transverse flow course or bore 35 which is adapted to be turned into communication with the seats 16 and 17 to permit flow through the valve when in such communication. When the ball is turned through an angle of 90°, to the position shown in FIG. 1, flow through the body between the inlet 12 and the outlet 13 is cut off and prevented.

For actuating the valve by fluid pressure from a remote point, the motor assembly or operator mechanism 40 is provided. This mechanism includes a motor mechanism or portion 41 and a rotator mechanism or portion 42. The motor mechanism may be any suitable fluid pressure controlled means for producing a reciprocating linear motion, while the rotator mechanism converts such linear motion into rotary motion for turning the trunnion 21 of the valve 10 about its longitudinal axis.

The motor portion comprises a body or housing 45 having a piston 46 slidable therein. Seal ring members 47 and 48 surround the piston and seal between the piston and the bore wall 49 of the cylinder body. An elongate coil spring 50 is disposed within the housing and confined between the underside 51 of the piston and a closure and connecter flange 52 at the upper end of the rotator mechanism, to which the cylinder body 45 is connected by threads 53. A piston rod 54 is connected by threads 55 to the central boss 46a on the under side of the piston 46 and extends downwardly axially of the bore 49 of the cylinder 45 and through an axial opening 56 at the upper end of the longitudinal bore 57 of the spoollike body 58 of the rotator mechanism 42. The spoollike body 58 of the rotator mechanism has an external annular flange 59 at its lower end and suitable bolts 60 extend through apertures in the flange and are threaded into the valve body 11 to hold the rotator mechanism in place on the valve body in axial alignment with the trunnion 21 of the rotatable valve member 15.

For rotating the ball valve closure member 15, an elongate tubular operator or rotator sleeve 65 is rotatably disposed within the bore 57 of the spoollike body 58. The lower portion of the bore of the sleeve is provided with flats 65a (FIG. 5) or a hexagonal or other noncircular shape corresponding to engage corresponding shaped boss or stem flats 66 on the projecting end of the trunnion 21, whereby rotation of the sleeve 65 will rotate the trunnion and ball closure member 15. The operator sleeve has a close fit on the boss 66 and is held against downward movement by engagement of the shoulders 67 at the lower ends of the flats 66 on the trunnion which engage the lower end of the sleeve and stop downward movement. The upper end of the sleeve is confined within the bore 57 beneath the internal annular shoulder 56a surrounding the axial opening 56 at the upper end thereof, and the sleeve is freely rotatable in the bore 57 of the body. Elongate longitudinally extending slots 68 are provided on diametrically opposite sides of the rotator sleeve for receiving slide bearing members 69 mounted on a transverse operator pin 70 extending diametrically across the sleeve and engaged in a transverse aperture 71 formed in a closure head 72 and apertures 73 formed in the depending skirt 74 of a bearing thimble 75. The upper end portion of the bearing thimble has a reduced bore forming an internal annular flange 76 which engages over an external annular bearing flange 77 on a stem extension 78 connected to the lower end of the piston rod 54 by a retaining pin 79. Bearings 80 are disposed between the upper surface of the bearing flange 77 and the internal annular flange 76 and between the upper end of the plug 72 and the lower surface of the bearing flange 77, so that the thimble and plug and the pin 70 connected therewith are freely rotatable with respect to the longitudinal axis of the elongate piston rod 54. Antifriction ball or roller bearings 90 are mounted on the reduced outer ends of the pin 70 and ride in arcuate or helical cam slots 91 formed in diametrically opposed sides of the wall of the body 58. The slots 91 are preferably helical in angular disposition and extend through a sufficient arc to cause the ball bearings 90 riding in such cam slots to move through an arc of 90° about the longitudinal axis of the piston rod 54 and the rotator sleeve 65.

The engagement of the slide bearing 69 with the vertical longitudinal slot 68 in the operator or rotator sleeve causes the operator sleeve to rotate about its longitudinal axis when the piston rod 54 is moved longitudinally and the bearings 90 ride along the helical cam slots 91. Thus, the longitudinal movement of the piston rod 54 is translated into a rotary movement of the actuator sleeve 65 and to rotation of the trunnion 21 of the closure member 15.

Operating fluid under pressure is introduced through a conduit 100 and a fitting 101 mounted in an aperture 102 in the cylinder 45 into the bore 49 of the cylinder above the piston 46. The fluid so introduced will move the piston downwardly in the cylinder against the force of the spring and so cause the ball valve member to be rotated through an arc of 90° and moved from a normally closed position to an open position permitting flow through the valve.

A relief valve 105 is threaded into an opening in the head of the cylinder 45 and provides for relief of excessive pressure within the chamber above the piston should such occur. A bleeder opening fitting or member 106 having a resilient slit valve cover 107 communicates with the lower portion of the bore 49 of the cylinder to permit the piston to move freely in the cylinder while the slit valve 107 limits entry of dust or like foreign matter into the cylinder bore.

A cover sleeve 110 which may be longitudinally split is fitted around the exterior of the body member 58 to prevent dirt or other foreign matter from entering the slots 91, the bore of the body or the rotator sleeve 65.

A plurality of longitudinal beveled ratchet slots or grooves 115 may be provided in the exterior peripheral surface of the rotator sleeve 65 to be engaged by the inner ratchet point end 116 of a detent plunger 117 to prevent rotating movement of the rotator sleeve, whereby the valve may be locked in the closed position, if desired. The ratchet plunger and the slots or grooves 115 permit manual rotation of the valve to closed position by means of the handle 30 against pressure exerted on the operator. The detent 117 is biased toward locking engagement with the slots by a spring 118 held in the lateral aperture 117a in which the detent plunger is positioned by a bushing 119 having a cross pin 120 therein to prevent rotation of the detent plunger. Lock nuts 121 may be provided on the threaded outer end of the detent plunger to lock the same in an inoperative position, if desired.

It will, therefore, now be seen that the rotary ball valve is rotatable between open and closed positions by the actuator mechanism 40, and is normally held in open position by fluid pressure introduced into the cylinder 45 of the motor portion above the piston 46. When the pressure in the cylinder is reduced or relieved through the control fluid line 100, the spring 50 moves the piston upwardly to cause the rotator spring 42 to rotate the ball valve to the closed position, the spring being sufficiently strong to rotate the valve member under normal conditions.

For assuring that the valve will positively move to closed position when pressure in the cylinder above the piston 46 is released, an elongate axial bore 130 is formed in the trunnion 21 of the valve member and has a reduced inlet opening 131 at its lower end communicating with the bore 35 of the spherical ball closure member 19. When the ball valve is in the open position, the fluid pressure present in the transverse bore 35 may pass inwardly through the inlet opening 131 into the elongate longitudinal bore 130 in the trunnion and act on a booster piston 140 which is slidable longitudinally in the bore 130 and extends upwardly out of the bore to engage the lower end 72a of the plug member 72. A sealing assembly 145 is mounted in an external annular groove 146 formed on the lower end of the booster piston 140 and seals between the piston 140 and the wall 147 of the bore 130. The sealing assembly 145 may comprise O-rings or other suitable sealing members, but is preferably formed with a plastic seal ring 150 of low friction material such as Teflon supporting a reinforced Teflon retaining ring 151 which also seals between the booster piston or plunger and the bore wall 147 in the trunnion. A T-shaped Neoprene or other suitable resilient seal and expander ring 155 is provided with a pair of plastic antifriction rings 156 which may be formed of Teflon or reinforced Teflon or the like. The ring 155 assures that the low friction seal rings 150 and 151 are maintained in proper high pressure sealing position, and yet provides some resiliency for low pressure sealing.

It will now be seen that, when the fluid pressure in the cylinder 45 above the piston 46 is released through the control fluid line 100, or by the relief valve 105, should the spring not be sufficiently strong to move the rotator mechanism 42 to cause the ball closure member 15 to be rotated to the closed position solely by the force of the spring; as, for example, when high pressure exists across the valve, the fluid pressure within the bore of the housing and present in the transverse bore 35 of the spherical ball valve member 19 will enter through the inlet opening 131 into the elongate booster cylinder bore 130 and act on the lower end of the booster piston or plunger 140 to force the piston longitudinally upwardly in FIG. 1 so that the upper end of the booster piston engages the lower end 72a of the closure head or plug 72 and moves the piston rod, head member and the pin 70 connected thereto upwardly in the body 58. Such upward movement causes the ball or roller bearings 90 to move along the arcuate cam slots 91 to rotate the actuator, or rotator sleeve 65 and turn the valve closure member to the closed position. When the transverse opening 35 through the valve closure member has moved past the outlet seat 17, so that the valve is closed, the fluid pressure present in such transverse bore will further continue to act on the booster piston to move the actuator mechanism to the full upward position. When the valve is closed, as shown in FIG. 1, fluid pressure may still be present in the transverse passage 35 and the bore 130, and so assures that the valve is held in the closed position.

It is also manifest that the booster piston structure provides for positive closing of the valve automatically when pressure in the flow passage through the valve housing exceeds a predetermined value, which may be determined by control of the control fluid pressure in the chambers 49a and 249a acting on the piston 46 and diaphragm 246, respectively. Thus, when the pressure in the valve flow passage acting against the lower end of the booster piston 140 is sufficient, acting with the springs 50 or 250, to overcome the force of the control fluid pressure acting on the piston or diaphragm, the booster piston will move the actuator mechanism upwardly to turn the valve to closed position.

Thus the valve is provided with fail safe operating structure for automatically and positively moving the valve to a closed position. Also, the booster piston provides for positive actuation of the valve even though the pressures in the valve be so great that the spring 50 does not function satisfactorily alone.

While a particular ball type valve has been shown, it is obvious that the actuator mechanism may be used to operate any rotary type valve.

The upper portion 130a of the booster cylinder bore 130 in the valve trunnion is enlarged and provided with screw threads 160 whereby a plug 161 may be threaded into the bore 130 to close the same in the event the valve is used without an actuator. The plug 161 has a threaded stem 162, a reduced cylindrical plug point 163 having seal ring 164 disposed in an external annular flange groove formed in such reduced cylindrical portion for closing off fluid pressure in the bore 130 against escape therefrom. A lateral breather hole 165 is formed in the wall of the trunnion above the internal annular shoulder 166, at the lower end of the enlarged portion 130a of the bore 130 which limits movement of the plug 161 into the bore, to permit relieving or equalizing the pressure present in the bore 130 when it is desired to remove the plug from position in the bore.

The valve, therefore, is convertible from manual operation to the actuator operation described.

Figure 7:
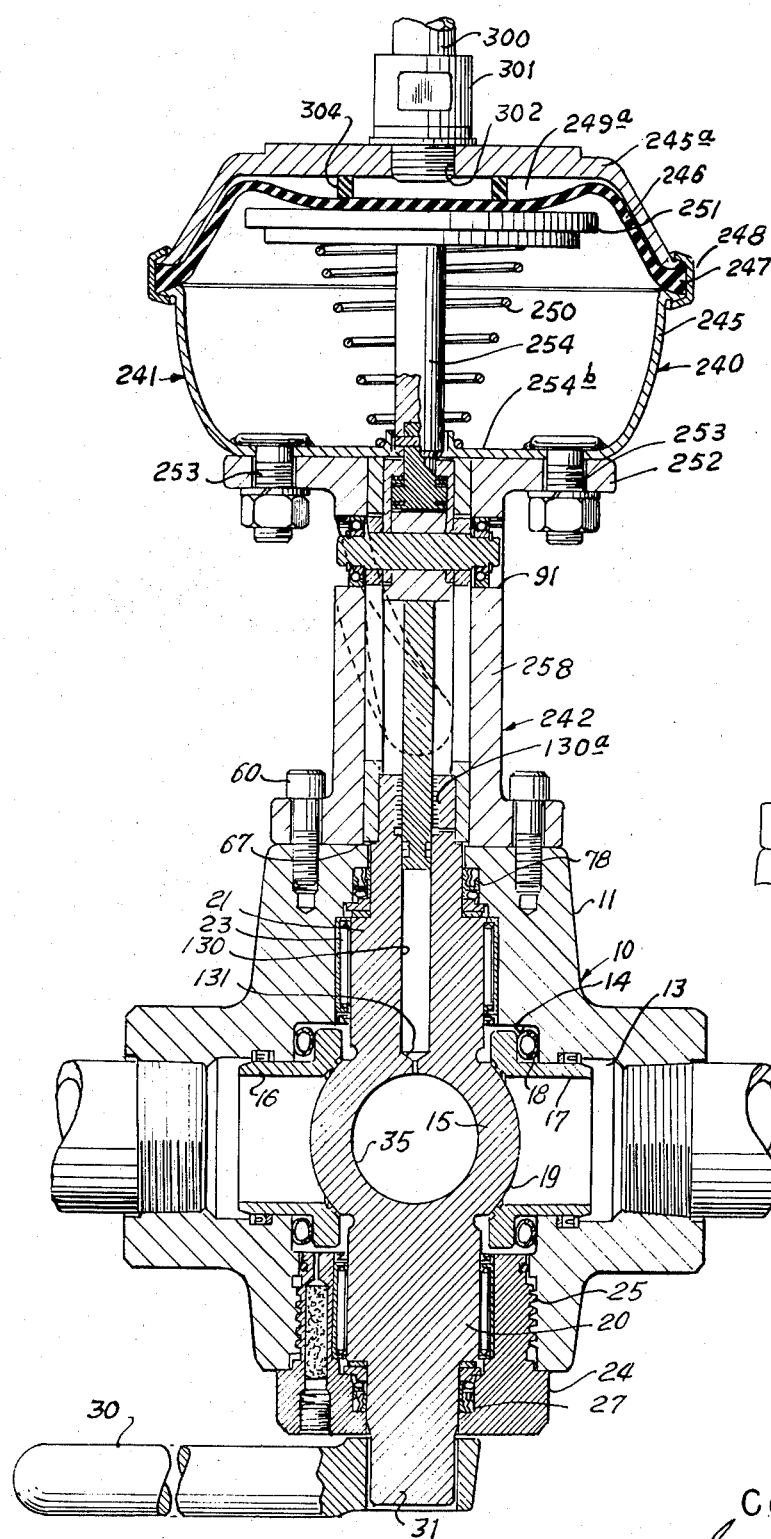
Figure 3:
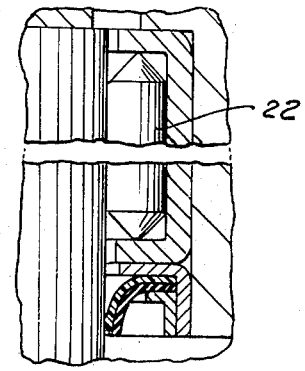
FIG. 3 is an enlarged view of the bearing and seal structure for the trunnion of the valve.
Figure 2:
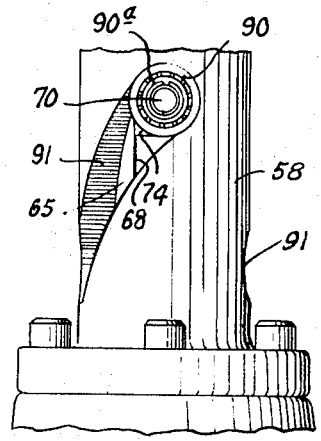
FIG. 2 is a view in elevation of the cam operator means for rotating the valve.
Figure 4:
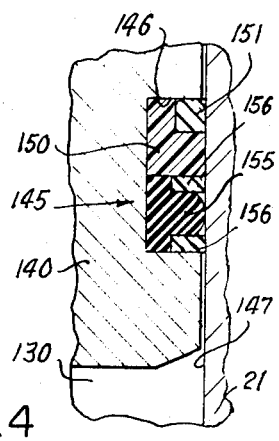
FIG. 4 is an enlarged fragmentary sectional view of the booster piston sealing structure.

A modified form of actuator 240 is shown in FIG. 7, wherein the motor portion 241 is provided with a diaphragm operator 246 rather than the piston of the form first described. The rod 254 is connected to a diaphragm supporting plate 251, and a spring 250 engages and is confined between the underside of the plate 251 and the upper surface of the lower closure portion 245b of the housing 245. The cap 245a of the housing is removably connected to the lower closure portion 245b by a channel shaped annular coupling member 245c which clamps the cap 245a to the upper flanged end of the lower portion 245b of the housing and confines the dovetailed or flared outer portion 247 of the flexible diaphragm 246 between the cap and lower portion of the housing, in sealing relationship with the cap portion of the housing. Fluid pressure is introduced through a fluid control fluid conduit line 300 connected to a fitting 301 threaded into a port or opening 302 in the cap. An annular spacer ring 304 secured to the inner central portion of the cap limits the upward movement of the supporting plate 251 and the diaphragm 246 toward the inlet port 302 and fitting 301. The diaphragm housing 240 is connected by bolts 253 to the external annular flanges plate 252 at the upper end of the spoollike body member 258 of the actuator mechanism 242.

The valve 10 and other portions of the actuator or operator mechanism 240 are identical to those of the form first described and are given the same numerals. The operation of the device is also identical, except that fluid pressure introduced through the conduit line 300 enters the chamber 249a in the cap portion 245a of the diaphragm housing and acts on the diaphragm 246 pressing against the plate 251 to move the rod 254 downwardly to cause the rotator mechanism 242 to rotate the ball valve. The spring 250 moves the plate 251 and the diaphragm 246 upwardly when pressure is released from the chamber 249a in the cap portion 245a of the housing.

Obviously, the detent means shown and described in the form of the valve illustrated in FIG. 1, and the protective sleeve 110 may be provided in this modified form of the valve, if desired. Obviously, also, the detent means may be omitted, if desired, from either form of the valve. It is also believed readily apparent that the ratchet detent mechanism provides for automatic locking of the valve in the closed position, when moved thereto by the actuator. Suitable relief valves similar to the valve 105, and a breather port member similar to the member 106 may be provided in the housing 245, if desired. Otherwise, the device functions in the same manner and accomplishes the same results as the form first described.

From the forgoing, it will be seen that an actuator mechanism has been provided for operating a rotary-type valve which is fluid pressure controlled and may be actuated and may be controlled from a remote point. It will also be seen that the actuator mechanism is failproof and is provided with means for automatically utilizing fluid pressure within the valve for assuring that the valve moves to closed position. It will further be seen that booster piston means is provided for overcoming friction in the event the spring is insufficiently strong to automatically cause the valve to close upon relief of control fluid pressure, and that the valve is provided with means for conversion between manual and actuator or motor operation. It will likewise be seen that the actuator mechanism is provided with means for positively locking the valve in closed position, or in open position, if desired.

The foregoing description of the invention is explanatory only, and changes in the details of the constructions illustrated may be made by those skilled in the art, within the scope of the appended claims, without departing from the spirit of the invention.

I claim:

1. A valve and operator for actuating the same including: a valve housing; a trunnion mounted rotatable valve member having a flow passage therethrough in said valve housing and rotatable about the axis of said trunnion mounting between open and closed positions; a fluid pressure motor unit having an actuating member movable linearly axially of the trunnion mount of the valve member; a rotator mechanism connected with said linearly movable actuating member and having means for converting linear movement of the actuating member to rotatable movement of said rotator mechanism about said trunnion mounting axis; means connecting said rotator mechanism with said trunnion of the rotatable valve member for rotating the valve member about the axis of said trunnion mounting; said fluid pressure motor unit comprising a chamber having a pressure responsive member movable therein connected with said actuating member; means for introduction of control fluid under pressure to said chamber to move said pressure responsive member for moving said actuating member linearly to cause the rotator mechanism to rotate the trunnion mounting and the valve member mounted thereon to rotate the valve member to open position; resilient means in said motor unit for actuating said pressure responsive member in an opposite linear direction to the direction of movement thereof by said control fluid pressure to actuate the rotator mechanism to rotate in the opposite direction to move the valve to closed position upon release of control fluid pressure from said chamber; booster means carried by said trunnion mounting to assist the resilient means in closing the valve, said booster means comprising a chamber in said trunnion mounting of said valve member having fluid communication with the flow passage of the valve member; a booster piston slidable in said chamber and operable by pressure of fluid within the valve housing entering the chamber through the valve member flow passage to move said booster piston into operating engagement with said linearly movable actuating member for moving said rotator mechanism in coaction with said resilient means to rotate said valve member to closed position.

2. In combination: a rotary-type valve having a housing and a trunnion supported rotatable valve member; and a fluid pressure motor unit and a rotator mechanism connected with motor unit and with said valve member and having linearly movable means movable by said fluid pressure motor unit for actuating said rotator mechanism to rotate said valve member on said trunnion support between closed and open positions in said valve housing; a chamber disposed in the trunnion supporting said valve member; a fluid pressure responsive booster piston slidable longitudinally in sealed relationship in said chamber in said trunnion and engageable with said linearly movable actuating means for moving said linearly movable means in a direction opposing said fluid pressure motor unit to actuate said rotator mechanism to rotate the valve member to closed position; means communicating said cylinder with said flow passage of said valve housing for conducting fluid pressure from said flow passage of said valve member to said cylinder to act on said booster piston to move said booster piston longitudinally to move said linearly movable means linearly to actuate said rotator mechanism to rotate the valve member to closed position.

3. The combination of claim 2 wherein the cylinder in the trunnion of the valve member is provided with means for receiving a plug for closing such cylinder to prevent fluid leakage therethrough when said piston is removed to permit manual actuation of said valve member.

4. A device of the character set forth in claim 2, wherein means is provided on said rotator mechanism for engaging and releasably holding said rotator mechanism against rotating movement about the longitudinal axis of said trunnion to releasably lock said valve in one of said closed and open positions.

5. A valve operator of the character set forth in claim 2 wherein said motor unit comprises a closed cylinder and a piston movable therein, and said linearly movable actuating member comprises a rod connected to said piston and movable linearly axially of said cylinder and the trunnion of said valve, and resilient means is provided in said cylinder acting on said piston moving said piston in a direction to move said valve to closed position.

6. A valve operator of the character set forth in claim 2 wherein the motor unit comprises: a housing and a flexible diaphragm operator disposed therein and including a support plate; said linearly movable actuating member comprises a rod connected to said support plate and movable linearly axially of said housing in line with the axis of said trunnion support of said valve member; and resilient means is provided between said diaphragm support plate and said housing for biasing said diaphragm support plate and the rod connected therewith in the direction to bias the valve member to closed position.

7. A valve operator of the character set forth in claim 2 and a manual operator means connected with the said trunnion support means for said valve member for manual actuation of said valve member.

8. A valve operator for rotating a trunnion mounted rotatable valve member having a flow passage therethrough in a valve housing between open and closed positions and including: linearly movable fluid pressure responsive motor means; a rotator mechanism connected with said linearly movable motor means for converting linear movement to rotary movement; means connecting said rotator mechanism with a trunnion of said valve member for rotating said valve member between open and closed positions; a cylinder formed in a trunnion of said valve member; fluid conduit means communicating said cylinder with the flow passage of the valve member; a booster plunger movable longitudinally in said cylinder in fluid sealed relationship therewith and engageable with said linearly movable motor means for moving said motor means in a direction opposite the movement of said fluid pressure responsive motor means to rotate said rotator mechanism to turn said valve member to closed position in response to fluid pressure from within the flow passage of the valve member.

9. A device of the character set forth in claim 8 wherein said rotator mechanism is provided with means for locking said rotator mechanism against rotating movement of said valve member.

10. A vale member having a housing with a flow passageway therethrough and a rotatable valve member having a transverse flow passage connected to and supported on trunnion members and rotatable about the longitudinal axis of said trunnion members in said housing between open and closed positions; fluid pressure actuating means movable linearly in alignment with the axis of said trunnion members and rotator means connected with said actuating means and operable thereby for rotating said valve member from open to closed position in response to linear movement of said fluid pressure actuating means by fluid pressure acting thereon; biasing means acting on said linearly movable actuating means in opposition to the fluid pressure acting thereon urging said actuating means in a direction to cause said rotator means to turn said rotatable valve member toward closed position; a booster cylinder formed in a trunnion member of said rotatable valve member extending axially longitudinally of said trunnion member and in axial alignment with said linearly movable actuating means; a booster plunger movable longitudinally in sealed relation in said cylinder and engageable with said linearly movable actuating means, and flow conduit means in said valve member and trunnion member for conducting fluid pressure from within the valve housing through the flow passage of the valve member to said booster cylinder to act on said booster plunger to move said plunger longitudinally to move said linearly movable actuating means in opposition to the movement of said actuating member by fluid pressure acting on said actuating means to operate said rotator means in coaction with said biasing means to rotate said valve member from open to closed position when the fluid pressure acting on said linearly movable actuating means is reduced to a predetermined value.

11. A valve comprising: a valve housing having a passageway therethrough; a trunnion supported rotatable valve member having a flow passage therein movable in said valve housing between an open condition and a closed condition; a fluid pressure motor unit mounted on said valve housing and having an actuating member movable linearly axially of the trunnion support of the valve member when fluid pressure is applied to the fluid pressure motor; a rotator mechanism operable by said actuating member for converting linear movement of the actuating member into rotatable movement of the trunnion and the valve member connected with said trunnion about the longitudinal axis of the trunnion support for turning the valve member to an open condition; and means for moving the actuating member and the trunnion and valve member in an opposite direction for turning the valve member to a closed condition, comprising: a spring cooperating with said actuating member for biasing said actuating member against the force of the fluid pressure motor unit for turning the valve member from an open condition to a closed condition; a bore in said trunnion support; a booster piston slidable in sealing engagement therewith longitudinally in said trunnion bore disposed to engage and cooperate with the actuating member to assist the spring in closing the valve; and means for conducting pressure of fluid within the valve housing through the flow passage of the valve member to the trunnion bore to move the booster piston in said bore to move said actuating member and the rotator mechanism in coaction with the spring to turn that valve member to its closed condition.

12. A valve as claimed in claim 11 characterized in that the trunnion bore is provided with means for receiving a plug for closing said bore when the piston is removed.